(12) United States Patent
Barrenscheen et al.

(10) Patent No.: US 7,620,835 B2
(45) Date of Patent: Nov. 17, 2009

(54) VOLTAGE SUPPLY CONTROL DEVICE AND METHOD

(75) Inventors: Jens Barrenscheen, München (DE); Frank Praemassing, Ratingen (DE)

(73) Assignee: Infineon Technologies AG, Munich (DE)

( * ) Notice: Subject to any disclaimer, the term of this patent is extended or adjusted under 35 U.S.C. 154(b) by 464 days.

(21) Appl. No.: 11/366,351

(22) Filed: Mar. 1, 2006

(65) Prior Publication Data

US 2006/0220592 A1  Oct. 5, 2006

(30) Foreign Application Priority Data

Mar. 1, 2005 (DE) .................... 10 2005 009 364

(51) Int. Cl.
G06F 1/26 (2006.01)
(52) U.S. Cl. ........................... 713/340; 713/300
(58) Field of Classification Search ............. 713/300, 713/340
See application file for complete search history.

(56) References Cited

U.S. PATENT DOCUMENTS

| 5,632,039 | A | 5/1997 | Walker et al. |
| 6,230,276 | B1 | 5/2001 | Hayden |
| 2001/0038277 | A1* | 11/2001 | Burstein et al. ............. 323/272 |
| 2003/0099145 | A1 | 5/2003 | Clark |
| 2005/0206355 | A1* | 9/2005 | Leith et al. ................. 323/274 |
| 2006/0203556 | A1* | 9/2006 | Chen et al. ............. 365/185.18 |

* cited by examiner

*Primary Examiner*—Tse Chen
(74) *Attorney, Agent, or Firm*—Dicke, Billig & Czaja, PLLC

(57) ABSTRACT

One embodiment of the invention provides a voltage supply control device, as well as a process for the control of the voltage supply of a semiconductor component, which can be operated in at least two different voltage supply modes. The process includes detecting the level of a voltage present at an output connection, which in one case is, a voltage output connection of the semiconductor component. The process also includes operating the semiconductor component in the first or second voltage supply mode, depending on the result of the detection.

19 Claims, 1 Drawing Sheet

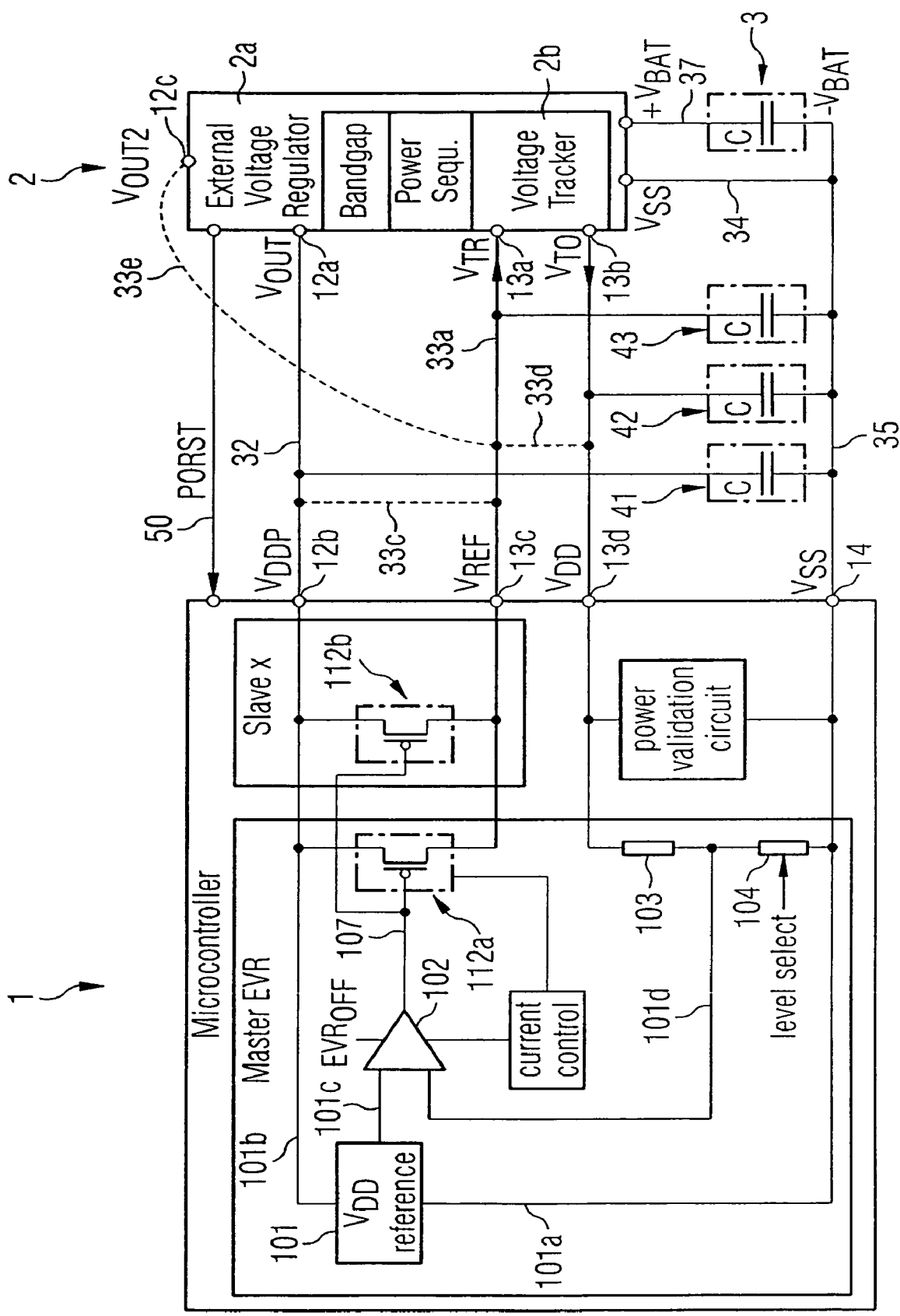

VOLTAGE SUPPLY CONTROL DEVICE AND METHOD

CROSS-REFERENCE TO RELATED APPLICATIONS

This Utility Patent Application claims priority to German Patent Application No. DE 10 2005 009 364.7, filed on Mar. 1, 2005, which is incorporated herein by reference.

BACKGROUND

One embodiment the invention relates to a process for the control of the voltage supply of a semiconductor component, as well as a voltage supply control device.

In semiconductor components, for instance computing circuits, for instance micro-controllers or micro-processors and/or memory components, for instance DRAMs (DRAM=Dynamic Random Access Memory and/or dynamic read/write memory) an internal voltage level used inside the component can differ from an external voltage level used outside the component.

In addition, several different internal voltage levels can be used—for instance between 1.5 V and 2.5 V for the core of a micro-controller and between 3 V and 5 V for the micro-controller input and output stages (ports).

A relatively low core voltage level has the advantage of allowing power losses inside the semiconductor component to be reduced, and for the elements of the micro-controller core to be manufactured with relatively small dimensions.

A relatively high port voltage level may be a requirement for allowing a semiconductor component to communicate with other components using corresponding external voltage levels.

The above external voltage level can be subject to relatively strong fluctuations and is therefore—in order to allow the component to be operated in a fault-free manner—usually converted by means of a voltage regulator to an internal voltage into an internal voltage (subject to relatively minor fluctuations and regulated to a particular constant reduced value).

To this end an external voltage regulator—independent of the relevant semiconductor component—can be used (for instance an external voltage regulator, which delivers the above core voltage, as well as the above port voltage).

In an alternative version, a corresponding—internal—voltage regulator (a so-called EVR (embedded voltage regulator)) can be provided on the semiconductor component itself, which generates the above core voltage from the above external voltage.

The provision of an internal voltage regulator has inter alia the disadvantage that a relatively large power loss, generated by the internal voltage regulator, has to be dissipated via the semiconductor component housing.

Conventional internal voltage regulators can for instance include a differential amplifier and a field effect transistor. The gate of the field effect transistor can be connected with an output of the differential amplifier and the source of the field effect transistors for instance with the external voltage supply.

A reference voltage—subject only to relatively minor fluctuations—is applied to the plus input of the differential amplifier. The voltage emitted at the drain of the field effect transistor can be back-connected directly with the minus input of the differential amplifier or with a voltage splitter inter-connected.

The differential amplifier regulates the voltage present at the gate connection of the field effect transistor in such a way that the (back-connected) drain voltage—and thereby the voltage emitted by the voltage regulator—remains constant and as high as the reference voltage, or for instance higher by a particular factor.

In a further alternative version for a voltage supply of a semiconductor component, an external power element, controlled by the semiconductor component, in particular a voltage tracking device can be used, into which an external voltage is fed, and which generates—under the control of the semiconductor component—a corresponding core voltage fed to the semiconductor component.

In the two latter versions (the EVR and the external power element), the core voltage can be controlled directly by the semiconductor component itself. Thereby the core voltage can be variably adjusted to the circumstances prevailing in each case and thereby the—total—energy consumption of the semiconductor component system can be reduced.

There are also versions available, in which a switch can be made between various voltage supply modes (supply by an EVR, or by an external power element, etc.) by applying a corresponding separate mode-switching control signal to an additional separate connection of the semiconductor component.

SUMMARY

One embodiment of the invention provides a novel process for the control of the voltage supply of a semiconductor component, as well as a novel voltage supply control device.

One aspect of the invention is a process for controlling the voltage supply of a semiconductor component that can be operated in at least two different voltage supply modes. The process includes detecting the level of a voltage present at an output connection ($V_{REF}$), and in one case, a voltage output connection ($V_{REF}$), for instance reference voltage output connection ($V_{REF}$) of the semiconductor component. The process also includes operating the semiconductor component in the first or second voltage supply mode, depending on the result of the detection.

In one embodiment, the second voltage supply mode is a mode in which a voltage generating device (EVR and/or Embedded Voltage Regulator) internally provided on the semiconductor component is used to provide the voltage supply for a semiconductor component.

In one embodiment of the invention, the first voltage supply mode is a mode in which a voltage supply facility, for instance a voltage tracking device or a voltage regulator, in particular a fixed voltage regulator, provided externally to the semiconductor component, is used for the voltage supply of the semiconductor component.

In the first voltage supply mode, the output connection ($V_{REF}$) of the semiconductor component is used by the semiconductor component for the emission of a control signal.

In one embodiment, the control signal emitted by the semiconductor component at the output connection ($V_{REF}$) of the semiconductor component in the first voltage supply mode can be used for the control of the voltage tracking device.

With the help of the above process switches can be made between the different voltage supply modes, without the necessity for a separate additional connection, in particular a pin and/or pad, at which a corresponding separate mode switching control signal would need to be applied.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 1 illustrates a schematic representation of a section of a semiconductor component, and an external voltage supply facility able to be connected to it, and a process for the control of the voltage supply of the semiconductor component in terms of an embodiment example of the invention.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In FIG. 1 a schematic representation of a section of a semiconductor component 1 and an external voltage supply facility 2 connectable to it is illustrated.

The external voltage supply facility 2 includes a voltage tracking device ("Voltage Tracker") 2b, as well as an external voltage regulator ("External Voltage Regulator") 2b.

The semiconductor component 1 can in principle be any suitable semiconductor component, for instance a memory component, for instance a DRAM, and/or a computer circuit, for instance a micro-processor, or—as in the above embodiment example—a micro-controller, for instance a micro-controller for the control of one or several components installed in a motor vehicle.

In the above semiconductor component several different internal voltage level can be used—for instance a relatively low voltage $V_{DD}$ for the core of the micro-controller (for instance between 1.5 V and 2.5 V), and a relatively high voltage $V_{DDP}$ (for instance between 3 V and 5 V) for the micro-controller input and output stages (ports).

With a relatively low core voltage level the power losses inside the semiconductor component 1 can be reduced, and the elements of the micro-controller cores can be manufactured with relatively small dimensions.

A relatively high port voltage level may be necessary to allow communication between the semiconductor component 1 and other external components using corresponding voltage levels.

The above external voltage regulator 2a, which is independent of the semiconductor component 1, can be used to provide the port voltage $V_{DDP}$.

The voltage supply facility 2 and/or the external voltage regulator 2a is, as is apparent from FIG. 1, connected via a line 37 with an external voltage source 3 (here: with a battery 3 (and/or with its plus pole+$V_{BAT}$)).

The voltage provided by the battery 3 can be subjected to relatively strong fluctuations.

The voltage provided by battery 3 is converted by means of the external voltage regulator 2a into a voltage $V_{OUT}$ (subject only to relatively minor fluctuations and regulated to a particular constant reduced value), which is emitted to a connection 12a (connection $V_{OUT}$) by the external voltage regulator 2a and fed via a line 32 to a (first) pin of a semiconductor component 1 and thereby to a (first) connection 12b (connection $V_{DDP}$) connected with it, in particular a pad of the semiconductor component 1 and used there as port voltage $V_{DDP}$.

As illustrated in FIG. 1 as an example and as is more closely described below, in a first operating mode of a semiconductor component 1 ("Voltage Tracker mode") a (second) connection 13c (connection $V_{REF}$), in particular a (second) pad of a semiconductor component 1 can be connected, via a corresponding semiconductor component-pin, and a line 33a, with an input connection 13a (connection $V_{TR}$) of the voltage tracking device 2b, and an output connection 13b (connection $V_{TO}$) of the voltage tracking device 2b, via a line 33b, with a corresponding (third) pin of a semiconductor component 1 and thereby with a (third) connection 13d (connection $V_{DD}$), in particular pad of the semiconductor component 1 connected with it.

The voltage $V_{TO}$ fed to the (third) connection 13d (connection $V_{DD}$) of a semiconductor component 1 by the voltage tracking device 2b is used in the above first operating mode ("Voltage Tracker mode") of the semiconductor component 1 as core voltage $V_{DD}$ in the semiconductor component 1.

As is further apparent from FIG. 1, a minus pole (−$V_{BAT}$) of the battery 3 is connected via a line 34 with the voltage supply facility 2 and via a (ground) line 35 with a corresponding (fourth) pin of a semiconductor component 1 and thereby with a (fourth) connection 14 (ground connection $V_{SS}$), in particular a pad of the semiconductor component 1.

Corresponding block capacitors 41, 42, 43 can in each case be connected between the (ground) line 35, and the above lines 32, and/or 33a, and/or 33b.

If the semiconductor component 1 is operated in a second operating mode ("EVR mode") instead of in the above first operating mode ("Voltage Tracker mode"), the (first) connection 12b (connection $V_{DDP}$), in particular pad of the semiconductor component 1 can be (directly)—as illustrated in FIG. 1 by the broken lines (and as is more closely described below)—conductively connected with its (second) connection 13c (connection $V_{REF}$), in particular with the pad of the semiconductor component 1 for instance via a line 33c (illustrated as a broken line) in particular via a bond wire connecting the two pads (alternatively the corresponding pins can for instance also be conductively connected with each other).

In the second operating mode ("EVR mode") the voltage tracking device 2b is disconnected from the semiconductor component 1, that is, there are (in contrast with what is illustrated in FIG. 1) no lines 33a, 33b between the voltage tracking device 2b, and the semiconductor component (and/or—in contrast with what is illustrated in FIG. 1—no voltage tracking device 2a has been provided (and therefore also no lines 33a, 33b connected with connections 13c, 13d in terms of the representation in FIG. 1)).

A corresponding—internal—voltage regulator (a so-called EVR (embedded voltage regulator)) (not shown here and indicated by the slave transistor 112b) has been provided on the semiconductor component 1.

As is more closely described below, the EVR in the above second operating mode ("EVR mode") can initially find itself in a deactivated state, and then be brought into an activated state.

In the activated state the EVR provided on the semiconductor component 1 converts the external voltage (for instance the voltage $V_{OUT}$ present in the second operating mode at the connection 12b of a semiconductor component and fed to it by the external voltage regulator 2a) into a relatively low voltage and subject to relatively minor fluctuations, which is emitted to a corresponding connection of the EVR (which is connected with connection 13d of the semiconductor component 1) and used in the semiconductor component 1 as core voltage $V_{DD}$.

If the semiconductor component 1, instead of being operated in the above first or second operating mode ("Voltage Tracker mode", or "EVR mode"), is operated in a third operating mode ("External Voltage Regulator mode"), the (second) connection 13c (connection $V_{REF}$), in particular the pad of the semiconductor component 1 can (as is illustrated with a broken line in FIG. 1 and as is more clearly described below) be (directly) conductively connected with the (third) connection 13d (connection $V_{DD}$), in particular the pad of the semiconductor component 1 for instance via a line 33d (illustrated as a broken line) in particular via a bond wire connecting both the two pads (alternatively for instance the corresponding pins can also be conductively connected with each other).

In the third operating mode ("External Voltage Regulator mode") the voltage tracking device 2b corresponding with the second operating mode ("EVR mode") can be disconnected by the semiconductor component 1, that is, in contrast with that illustrated in FIG. 1, no lines 33a, 33b are present between the voltage tracking device 2b and the semiconductor component (and/or in contrast to that illustrated in FIG. 1 no voltage tracking device 2a has been provided (and thereby also no lines 33a, 33b, as per the representation of FIG. 1 connected with the connections 13c, 13d)); in addition, in contrast with the second operating mode ("EVR mode") and corresponding with the first operating mode ("Voltage Tracker mode") no (direct) conductive connection has been provided between the first and second connections 12b, 13c (connections $V_{DDP}$, and $V_{REF}$) of a semiconductor component 1 (that is, no line 33c illustrated by a broken line in FIG. 1 or a corresponding line).

As is apparent from FIG. 1 the external voltage regulator 2a includes, apart from the connection 12a (connection $V_{OUT}$), another further connection 12c (connection $V_{OUT2}$).

The voltage provided by the battery 3 is additionally converted (apart from into the voltage $V_{OUT}$ emitted at 12a (connection $V_{OUT}$)) into a further voltage $V_{OUT2}$, emitted at the further connection 12c (connection $V_{OUT2}$) by means of the external voltage regulator 2a, (which voltage corresponding with the voltage $V_{OUT2}$ is subject only to relatively minor fluctuations and is regulated to a particular, constant value which is lower than the value of the voltage $V_{OUT}$).

In the above third operating mode ("External Voltage Regulator mode"), as illustrated with a broken line in FIG. 1 (and as is more clearly described below), the second and third connections 13c, 13d (connections $V_{REF}$, $V_{DD}$) of the semiconductor component 1 and/or the corresponding pads or pins are (directly) conductively connected with the above (further) connection 12c (connection $V_{OUT2}$) of the external voltage regulator 2a, for instance via a line 33e, illustrated in FIG. 1 by a broken line.

The voltage $V_{OUT2}$ led in this way to the (third) connection 13d (connection $V_{DD}$) of a semiconductor component 1 by the external voltage regulator 2a is in the above third operating mode ("External Voltage Regulator mode") of a semiconductor component 1 used in the semiconductor component 1 as the core voltage $V_{DD}$.

As is apparent from FIG. 1, the semiconductor component 1 includes a reference voltage generating device 101, a first and second transistor 112a, 112b (here: two p-channel field effect transistors), an operational amplifier and/or differential amplifier 102, as well as a first resistance 103, and a second—adjustable—resistance 104.

The resistances 103, 104 represent a voltage splitter.

A corresponding band gap switching module can be used as a reference voltage generating device 101, which as is apparent from FIG. 1 is connected via a line 101a with connection 14 (connection $V_{SS}$) (and is thereby grounded), and via a line 101b with connection 12b (and thereby with the above voltage $V_{DDP}$, provided by the external voltage regulator 2a).

The reference voltage generating device 101 generates a constant comparative voltage of a lower value (for instance a voltage of 1.2 V) from the voltage $V_{DDP}$ in comparison with the voltage $V_{DDP}$ fed to it, which is led via a line 101c to a first input of the operational amplifier 102.

As is further apparent from FIG. 1, the voltage splitter including the resistances 103, 104 reduces the voltage $V_{DD}$ present at the connection 13d (connection $V_{DD}$) of the semiconductor component 1 (and in fact to a value adjustable by means of the adjustable resistance 104), and the reduced voltage is fed via a line 101d to a second input of the operational amplifier 102.

The output of the operational amplifier 102 is connected via a line 105 with the gate of the field effect transistor 112a, and with the gate of the field effect transistor 112b.

The drain source path of the field effect transistors 112a, 112b are connected between the above connection 12b (connection $V_{DDP}$) and the above connection 13c (connection $V_{REF}$) of a semiconductor component 1.

In an alternative embodiment example, the drain source path of the field effect transistor 112b (slave transistor) can also be connected between the above connection 12b (connection $V_{DDP}$), and the above connection 13d (connection $V_{DD}$) of the semiconductor component 1 and/or several correspondingly connected slave transistors can be provided (for instance more than three, five or seven slave transistors, distributed over the semiconductor component 1).

In the above first operating mode ("Voltage Tracker mode") as already indicated above, the voltage $V_{REF}$ emitted by the field effect transistors 112a, 112b onto connection 13c (connection $V_{REF}$) is fed via the above line 33a to the connection 13a (connection $V_{TR}$) of the voltage tracking device 2b. Thereby only a relatively low constant current flows, for instance a current in the μA range, in order to reflect programmed voltage changes, more current needs to be available in the transitional phases.

In the voltage tracking device 2b an impedance transformation is performed in the conventional manner, and at the connection 13b (connection $V_{TO}$) of the voltage tracking device 2b a voltage $V_{TO}$, corresponding with the voltage $V_{REF}$ at the connection 13a of the voltage tracking device 2b and "tracking" it, is generated, and back-connected via the above line 33b with the semiconductor component 1 (i.e. with the connection 13d (connection $V_{DD}$) of the semiconductor component 1 and thereby fed to the above resistance 103 of the voltage splitter of a semiconductor component 1). In the process a relatively high current, for instance a current in the upper mA range, flows.

By means of the regulatory loop created inter alia by the voltage splitter (resistances 103, 104), the operational amplifier 102, the field effect transistors 112a, 112b and the voltage tracking device 2b, the voltage $V_{REF}$ present at connection 13c (connection $V_{REF}$), and thereby also the voltage $V_{DD}$ at the connection 13d (connection $V_{DD}$) and thereby the core voltage $V_{DD}$, is regulated to a value correspondingly adjustable for height by changing the resistances 104 (whereby the voltages $V_{REF}$ and/or $V_{DD}$ could for instance amount to 1.5 V).

A voltage comparator facility (not shown here) has been provided in the semiconductor component 1 (connected between the (ground) connection 14 (connection $V_{SS}$) and the connection 13c (connection $V_{REF}$)), which facility compares the voltage present at connection 13c (connection $V_{REF}$) with a pre-determined critical value $V_{threshold}$. The pre-determined critical value should preferably lie somewhat above the (desired) core voltage (for instance $V_{DD}$), for instance more than 20% or more than 50% above the core voltage (for instance $V_{DD}$), for instance by 2.5 V.

If the voltage comparator facility detects that the voltage present at connection 13c (connection $V_{REF}$) lies, as is the case in the above first operating ("Voltage Tracker") mode, below the above critical value $V_{threshold}$ (for instance below 2.5 V) (as is more closely illustrated below) the EVR is deactivated; the core voltage is then only made available by the above voltage tracking device 2b (under control of the semiconductor component 1) (and the port voltage by the external voltage regulator 2a).

As already explained above, in the above third operating mode ("External Voltage Regulator mode") (as illustrated in FIG. 1 by a broken line) the second and third connections 13c, 13d (connection $V_{REF}$, $V_{DD}$) of the semiconductor component 1 are conductively connected with each other, and via the above line 33e with the above (further) connection 12c (connection $V_{OUT2}$) of the external voltage regulator 2a.

The voltage $V_{OUT2}$ fed in this way to the (second and third) connection 13c, 13d (connection $V_{REF}$, $V_{DD}$) of the semiconductor component 1 from the external voltage regulator 2a, can for instance amount to between 1.5V and 1.7V. In the third operating mode ("External Voltage Regulator mode"), corresponding with the first operating mode ("Voltage Tracker mode"), it is accordingly detected by the voltage comparator facility that the voltage present at connection 13c (connection $V_{REF}$) lies below the above critical value $V_{threshold}$ (for instance below 2.5V).

In this case too (as is more closely illustrated below) the EVR is deactivated; the core voltage is then only made available by the external voltage regulator 2a (without any possibility of control by the semiconductor component 1) (and the port voltage likewise by the external voltage regulator 2a).

As also already described, in the above second operating mode ("EVR mode") (as illustrated by a broken line in FIG. 1) the first and second connection 12b, 13c (connection $V_{DDP}$, $V_{REF}$) of the semiconductor component 1 are conductively connected with each other, and via the above line 32 with the above (first) connection 12b (connection $V_{OUT}$) of the external voltage regulator 2a.

In this way the voltage $V_{OUT}$ fed to the first and second connection 12b, 13c (connections $V_{DDP}$, $V_{REF}$) of the semiconductor component 1 by the external voltage regulator 2a can for instance amount to between 3 V and 5 V.

Accordingly, in contrast to the first and third operating mode ("Voltage Tracker mode", and "External Voltage Regulator mode"), in the second operating mode ("EVR mode") it is detected by the voltage comparator facility that the voltage present at connection 13c (connection $V_{REF}$) lies above the critical value $V_{threshold}$ (for instance above 2.5V).

In this case (as is more closely illustrated below) the EVR is brought into an activated state; the core voltage is then solely supplied by the EVR internally provided on the semiconductor component 1 (and can correspondingly be controlled by the semiconductor component 1) (and the port voltage, again by the external voltage regulator 2a).

By means of the above block capacitor 43 (which forms part of the above control circuit) it can be achieved that the resistance to distortion of the voltage present at the connection 13c (connection $V_{REF}$) is reduced.

With the help of the above process a switch can be made between the different operating modes without the need for a separate additional pin and/or a separate additional pad at which a corresponding mode switching control signal is applied.

The EVR is in each case, during and/or after powering up the system ("Power On"), initially left in a deactivated state (for instance by a signal EVVR_OFF being brought into a "high logic" state, whereby a deactivated state is forced onto the voltage comparator facility monitoring the voltage present at connection 13c (connection $V_{REF}$), and on the EVR), and it is waited until the voltage applied to connection 12b (connection $V_{DDP}$) lies within a valid range.

To this end, a further voltage comparator facility ("Supply Watchdog") not shown here (connected between the (ground) connection 14 (connection $V_{SS}$) and connection 12b (connection $V_{DDP}$)) is provided on the semiconductor component 1, which monitors the voltage present at connection 12b (connection $V_{DDP}$).

If the voltage is sufficiently high and if no power-on reset signal (PORST signal) is sent by the voltage supply facility 2 via a line 50 to the semiconductor component 1, the signal EVVR_OFF is brought into a "low logic" state, whereby the voltage comparator facility monitoring the voltage at connection 13c (connection $V_{REF}$) is activated.

If the voltage comparator facility detects that the voltage present at connection 13c (connection $V_{REF}$) lies above the above critical value $V_{threshold}$ (for instance above 2.5V) (second operating mode ("EVR mode")), a bit value stored in a register EVRINT is set to "1", otherwise (i.e. whenever the voltage present at connection 13c (connection $V_{REF}$) lies below the above critical value $V_{threshold}$ (for instance below 2.5V)) the bit value stored in the register EVRINT is set to "0" (first and/or third operating mode ("Voltage Tracker mode", and/or "External Voltage Regulator mode")).

At a register bit value "0" the EVR is brought into a deactivated state (and/or remains in such a state); in case of a register bit value "1" the EVR is activated.

The bit value stored in the register EVRINT is then, regardless of the voltage detected in succession at connection 13c by the voltage comparator facility (higher or lower than the critical value $V_{threshold}$), not changed, unless the above signal EVVR_OFF is brought into a "high logic" state (see above). Where this is the case, the bit value stored in the register is (again) reset to "0".

In other words, in order to prevent faults, the deciding result produced by the voltage comparator facility monitoring the voltage at connection 13c (the voltage at connection 13c is either higher or lower than the critical value $V_{threshold}$) is stored and/or frozen until a power-on reset takes place, only then is a new evaluation done.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A process for controlling the voltage supply of a semiconductor component that can be operated in a plurality of different voltage supply modes, the process comprising:
   detecting the level of a voltage present at an output connection of the semiconductor component; and
   operating the semiconductor component in one of a first and a second voltage supply modes, depending on the result of the detection, wherein in a third voltage supply mode a voltage regulator, provided externally to the semiconductor component is used for the voltage supply of the semiconductor component, where a voltage input connection of the semiconductor component is connected with the output connection of the semiconductor component during the third, but not during the first and second voltage supply modes, and wherein a further voltage input connection of the semiconductor component is connected with the output connection of the semiconductor component during the second, but not during the first and third voltage supply modes.

2. The process of claim 1, wherein in the first voltage supply mode, the output connection of the semiconductor component is used by the semiconductor component for the emission of a control signal.

3. The process of claim 1, wherein the first voltage supply mode is a mode in which a voltage tracking device, provided externally to the semiconductor component, is used for the voltage supply of the semiconductor component.

4. The process of claim 3, wherein the control signal emitted by the semiconductor component during the first voltage supply mode at the output connection of the semiconductor component is used for the control of the voltage tracking device.

5. The process of claim 1, wherein the semiconductor component is operated in the first voltage supply mode when it is detected during step that the voltage at the output connection is lower than a predetermined threshold value.

6. The process of claim 1, wherein the semiconductor component is operated in the second voltage supply mode when it is detected that the voltage at the output connection is higher than a predetermined threshold value.

7. The process of claim 1, wherein the second voltage supply mode is a mode in which a voltage generating device internally provided on the semiconductor component is used for the voltage supply of the semiconductor component.

8. The process of claim 3, wherein a voltage input connection of the semiconductor component, is connected with an output connection of the voltage tracking device during the first voltage supply mode.

9. The process of claim 8, wherein the voltage output connection of the semiconductor component is connected with a further voltage input connection of the semiconductor component during the second voltage supply mode.

10. The process of claim 1, wherein the semiconductor component can be operated in three or more different voltage supply modes.

11. The process of claim 9, wherein the level of the voltage at the voltage output connection of the semiconductor component is only detected once the voltage present at the further voltage input connection of the semiconductor component, lies within predetermined range.

12. The process of claim 9, wherein the semiconductor component is only brought into the second voltage supply mode, once the voltage present at the further voltage input connection of the semiconductor component, lies within a predetermined range.

13. The process of claim 1, wherein the detection result received is stored in a register.

14. A voltage supply control device comprising:
   means for detecting the level of a voltage present at a voltage output connection of a semiconductor component; and
   means for activating and deactivating a voltage generating device internally provided on the semiconductor component, depending on the result of the detection, wherein a voltage input connection of the semiconductor component is connected with the voltage output connection of the semiconductor component during at least one voltage supply mode of the device, but not during at least a further voltage supply mode of the device, and wherein a further voltage input connection of the semiconductor component is connected with the voltage output connection of the semiconductor component during the further voltage supply mode of the device, but not during the at least one voltage supply mode of the device.

15. The voltage supply control device of claim 14, wherein the semiconductor component is operated in one of a first and second voltage supply modes depending on the result of the detection.

16. The voltage supply control device of claim 14, wherein in the first voltage supply mode, an output connection of the semiconductor component is used by the semiconductor component for the emission of a control signal.

17. The voltage supply control device of claim 14, wherein the first voltage supply mode is a mode in which a voltage tracking device, provided externally to the semiconductor component, is used for the voltage supply of the semiconductor component.

18. The voltage supply control device of claim 16, wherein a control signal emitted by the semiconductor component during the first voltage supply mode at the output connection of the semiconductor component is used for the control of the voltage tracking device.

19. A process for controlling the voltage supply of a semiconductor component that can be operated in at least a first and a second different voltage supply modes, the process comprising:
   detecting the level of a voltage present at an output connection of the semiconductor component by a voltage comparator circuit provided on the semiconductor component for deciding in which of the first and second voltage supply modes the semiconductor component is to be operated;
   using a voltage regulator for the voltage supply of the semiconductor component in a third voltage supply mode, the voltage regulator provided externally to the semiconductor;
   coupling a first voltage input connection of the semiconductor component with the output connection of the semiconductor component during the third voltage supply mode;
   decoupling the first voltage input connection of the semiconductor component from the output connection of the semiconductor component during the first and second voltage supply modes;
   coupling a second voltage input connection of the semiconductor component with the output connection of the semiconductor component during the second voltage supply mode; and
   decoupling the second voltage input connection of the semiconductor component from the output connection of the semiconductor component during the first and third voltage supply modes.

* * * * *